United States Patent
Neel et al.

(10) Patent No.: US 9,938,441 B2
(45) Date of Patent: Apr. 10, 2018

(54) POLYVALENT POLLUTION REMOVAL COMPOSITION AND USE THEREOF

(71) Applicant: PREVOR INTERNATIONAL, Paris (FR)

(72) Inventors: Mathilde Neel, Asnieres sur Seine (FR); Laurence Mathieu, Talence (FR); Joel Blomet, Valmondois (FR); Marie-Claude Meyer, Paris (FR)

(73) Assignee: PREVOR INTERNATIONAL, Paris (FR)

( * ) Notice: Subject to any disclaimer, the term of this patent is extended or adjusted under 35 U.S.C. 154(b) by 0 days.

(21) Appl. No.: 14/648,146

(22) PCT Filed: Nov. 28, 2013

(86) PCT No.: PCT/FR2013/052890
§ 371 (c)(1),
(2) Date: May 28, 2015

(87) PCT Pub. No.: WO2014/083286
PCT Pub. Date: Jun. 5, 2014

(65) Prior Publication Data
US 2015/0299546 A1    Oct. 22, 2015

(30) Foreign Application Priority Data
Nov. 28, 2012    (FR) ..................... 12 61359

(51) Int. Cl.
*C09K 3/32*    (2006.01)

(52) U.S. Cl.
CPC .................... *C09K 3/32* (2013.01)

(58) Field of Classification Search
CPC ........................................ C09K 3/32
See application file for complete search history.

(56) References Cited

U.S. PATENT DOCUMENTS

| | | |
|---|---|---|
| 3,354,886 A | 11/1967 | Berger et al. |
| 6,911,189 B1 | 6/2005 | Koller et al. |
| 7,343,874 B2 * | 3/2008 | DeLeeuw ............ A01K 1/0154 119/171 |
| 2003/0191226 A1 | 10/2003 | Chapman et al. |

FOREIGN PATENT DOCUMENTS

WO    82/04271 A1    12/1982

OTHER PUBLICATIONS

International Search Report, dated Mar. 7, 2014, from corresponding PCT application.

* cited by examiner

*Primary Examiner* — Peter F Godenschwager
(74) *Attorney, Agent, or Firm* — Young & Thompson

(57) ABSTRACT

A pollution removal composition includes: (a) at least one silica gel; and (b) at least one wood-derived absorbent agent, characterized in that the silica gel has a grain-size distribution of between 60 and 500 ym and a density of between 150 and 400 kg/m$^3$. A pollution removal method using the composition is also described.

10 Claims, 1 Drawing Sheet

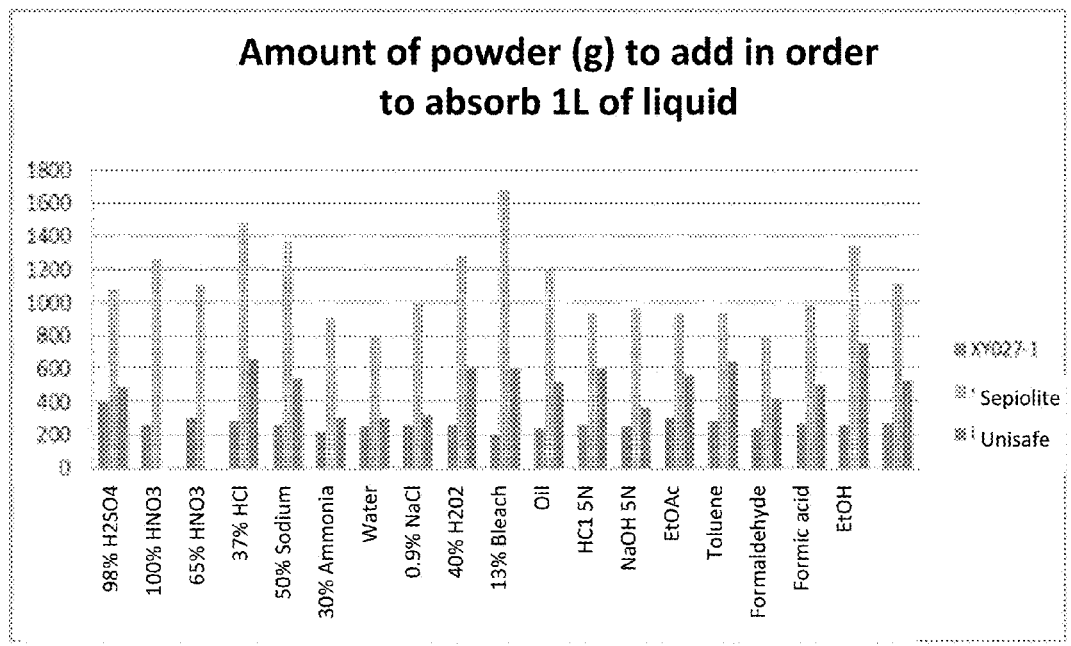

POLYVALENT POLLUTION REMOVAL COMPOSITION AND USE THEREOF

FIELD OF INVENTION

The present invention relates to a pollution removal composition and its use in the fight against chemical pollution caused by inadvertent spillage of fluids of all kinds.

Nowadays, we are increasingly exposed to chemical pollution in our environment, in our food and at work.

In case of accident, these chemical pollutants potentially pose problems of pollution and safety at different scales. For example, a road accident involving a truck carrying toxic or hazardous raw materials can cause environmental pollution or damage to the road. In industry or in laboratory, mishandling of a canister containing a toxic or hazardous raw material can cause injury to personnel or damage devices. Therefore, rapid control of pollution is paramount in many situations. In these emergency situations, it is better to have a product applicable to all types of products.

PRIOR ART

Many versatile compositions are used to fight against chemical pollution.

Dried natural minerals, such as sepiolite, diatomaceous earth, sand, vermiculite have been used conventionally. These natural minerals are non-toxic, but they generate large amounts of waste to be stored or treated.

Wood sawdust is also used, but it reacts with sulfuric acid to form sticky black oil, which is difficult to get rid of. Absorbent compositions comprising amorphous silicic acid (Chemizorb®) experienced significant growth in recent years. However, large amounts of these compositions are needed to absorb the liquid and the resulting product leaves a thin film of liquid on the ground.

A composition comprising a super absorbent polymer and silica has also been placed on the market under the brand Unisafe®. This composition does not involve dangerous reaction, however it is rather expensive and the resulting product leaves a thin film of liquid on the ground.

Thus, to date, there is no pollution removal composition:
(1) that is non-irritating;
(2) that allows absorption of liquid pollutants of all types,
(3) that is not harmful or dangerous in use,
(4) that forms with the pollutant a residue that is easy to pick up, and
(5) that does not leave a residue on the floor, and
(6) that allows pollution removal and pick up of obtained residues at a low cost.

Indeed, these six criteria may be contradictory. However, the present inventors have had the merit of finding a pollution removal composition which represented an excellent compromise between these different criteria (1)-(6).

PRESENT INVENTION

Thus, the invention provides a pollution removal composition comprising:
(a) at least one silica gel, and
(b) at least one wood derived absorbing agent,
characterized in that said silica gel has a particle size from 60 to 500 µm, preferably from 120 to 400 µm, and even more preferably from 150 to 300 µm, and a mass density from 150 to 400 kg/m$^3$, preferably from 200 to 380 kg/m$^3$, and more preferably from 250 to 350 kg/m$^3$.

The particle size is measured by dry sieving.

To the knowledge of the inventors, such a composition has never been disclosed by the prior art.

"Pollution removal" refers to the complete absorption of chemical pollutants and their retention.

The composition of the present invention is in a solid powdered form, it can therefore easily be spread around or on the polluting liquid.

"Absorb" refers to bringing to a solid form the pollutant that was initially in liquid form by mixing it with the pollution removal composition.

The smaller the amount needed to absorb the liquid pollutant, the more efficient the said composition.

The residue, obtained after the application of said composition according to the invention on the liquid having caused the pollution, should be easy to pick up.

"Easy to pick up" refers to that the characteristics of the residue obtained are such that there is no particular technical difficulty in pick it up, and the pickup operation can be carried out by means commonly used by a skilled person. Thus, the residue obtained by use of the composition according to the invention is not slimy or sticky, and is in a form of a solid gel, which can therefore be easily removed without leaving a residue bonded to the surface on which the liquid had spread by means commonly used by the skilled person, such as, for example, a shovel or vacuum, etc.

The pollution removal composition according to the present invention does not contain any harmful ingredient, i.e. any ingredient requiring special labeling, such as nanoparticles or irritating compounds.

In addition, when used, the composition has no harmful or dangerous effect. It can be handled safely. When it comes into contact with acidic or basic pollutants, it does not lead to an excessive exothermic reaction, i.e. at a level where the temperature increase may damage the surrounding environment. Furthermore, there is no toxic gas release related to the reaction of the absorbing product with the spilled chemical.

Finally, the total cost of pollution removal implementing the composition according to the invention is low. It should be noted that the total cost of pollution removal not only comprises the cost of raw materials and manufacturing of the composition, but also the cost of pick up operations and residues treatment (such as incineration), hence the importance of getting a waste that is easy to pick up and has a reduced mass quantity. Now, due to its high absorbing capacity, the amount of pollution removal composition used in the fight against liquid pollution is low. The minimal amount used will therefore create a minimal mass of waste to be stored and/or processed.

Composition (a) Silica Gel

The term "silica gel" refers to an amorphous synthetic silica polymer prepared from sodium silicate.

The silica gel is especially known as a food additive called E551.

Silica gel grains are porous. This specific structure of silica gel allows both to absorb the liquid to be cleared and to give a residue that is not sticky and is easy to pick up.

The present inventors have found that a silica gel with a particle size from 60 to 500 µm, preferably from 120 to 400 µm, and more preferably from 150 to 300 µm, and a mass density of 150 to 400 kg/m$^3$, preferably from 200 to 380 kg/m$^3$, and more preferably from 250 to 350 kg/m$^3$, is the most efficient for pollution removal.

Such a silica gel is marketed, for example, under the brand Tixosil (in particular, Tixosil 68®) produced by Rhodia, Upasil (in particular, Upasil 60®) produced by Upagchem. Another option is to use silica gel for chromatography sold by Aldrich, VWR, Accros. Tixosil 68® absorbs about 3 times its weight of liquid and is relatively inexpensive.

Upasil 60® absorbs about twice its weight in liquid. Silica gels for chromatography absorb between 1.5 and 2.5 times their weight depending on their porosity.

Said silica gel has an absorption capacity from 1 L to 10 L per 1 kg, and preferably from 2 L to 4 L per 1 kg.

b) Wood Derived Absorbing Agent

"Wood derived absorbing agent" refers to natural products from wood, straw or corn, comprising cellulose, hemicellulose and/or lignin.

In a particular embodiment of the present invention, said wood derived absorbing agent is selected from wood sawdust, wood chips, wood powder, chopped straw, ground corn, cellulose, hemicellulose, lignin and mixtures thereof.

As an example of wood derived absorbing agent, the product marketed under the brand Lignocel C250S® can be used. Lignocel C250S® has good absorption capacity and its cost is low. One kg of Lignocel C250S® absorbs 10 to 20 L of liquid product.

This type of compound is not irritating and does not emit harmful gases during use. It can absorb efficiently all types of liquids at very low cost. However, it tends to form a sticky paste on the ground during pollution removal, and reacts, in particular, with sulfuric acid to form a black and sticky oil, so its use alone is therefore not recommended.

c) Additives

In addition, the composition according to the present invention may optionally contain at least one additive selected from pH indicator agents, dyes and scents, flow improvers, bulking agents, etc. The skilled person is able to choose, from among all of these optional additives, both the composition and the amount of those that will be added to the composition, so that it retains all of its properties.

pH Indicator Agent"

"pH indicator agent" refers to compounds that have the ability to change color depending on the pH of their environmental medium.

Examples of pH indicators are thymol blue, tropaeolin, bromocresol purple, bromophenol blue, Congo red, neutral red, phenolphthalein, thymolphthalein, alizarin yellow R, bromothymol blue, cresol red, methyl violet, malachite green, methyl yellow, Congo red, methyl orange, bromocresol green, methyl red, phenol red, alizarin, indigo carmine, and mixtures thereof.

Thus, in a particular embodiment of the present invention, the composition further comprises at least one pH indicator agent selected from tropaeolin, thymol blue, bromocresol purple, bromophenol blue, Congo red, neutral red, phenolphthalein, thymolphthalein, alizarin yellow R, and mixtures thereof.

The presence of a pH indicator agent allows quickly checking the pH of the residue and taking the necessary precautions for handling the residue formed.

Dye

Examples of dyes include any non-toxic dyes, such as food grade dyes. These may be, in particular, patent blue V, carmoisine, tartrazine, etc.

Scent

Scents can be of natural origin, such as essential oils from flowers, fruits, wood bark (cinnamon, sandalwood), resin (frankincense, myrrh), etc. Synthetic scents such as vanillin may also be used.

Flow Agents

To facilitate the spreading of the composition according to the invention, it may include flow agents. Examples of such agents include sand, peat, etc.

Bulking Agents

In order to increase the absorption capacity of aqueous solutions, super absorbent polymers such as sodium polyacrylate, potassium polyacrylate or polyamide or this type of block copolymers may be added to the mixtures. Examples of usable commercial products include in particular Aquakeep® and Tramfloc®.

In a particular embodiment of the present invention, said silica gel is present in an amount ranging from 60% to 95%, preferably from 70% to 90%, and even more preferably from 75% to 80% by weight relative to the total weight of the composition.

In a particular embodiment of the present invention, said wood derived absorbent is present in an amount ranging from 5% to 40%, preferably from 10% to 30%, and even more preferably from 15% to 20% by weight relative to the total weight of the composition.

In a particular embodiment, the mass ratio of the silica gel to the wood derived absorbent is from 95:5 to 60:40, preferably from 90:10 to 75:25, and even more preferably about 80:20.

In a particular embodiment of the present invention, said pH indicator is present in an amount ranging from 0.001% to 0.1%, preferably from 0.005% to 0.08%, and even more preferably from 0.01% to 0.05% by weight relative to the total weight of the composition.

A composition according to the invention comprises:
from 60 to 95%, preferably from 70 to 90%, and even more preferably from 75 to 80% of silica gel having a particle size from 60 to 400 μm and a mass density from 200 to 400 kg/m$^3$;
from 5 to 40%, preferably from 10 to 30%, and more preferably from 15 to 20% of wood derived absorbent;
from 0 to 2%, preferably from 0.001 to 0.1%, and more preferably from 0.05 to 0.5% of at least one additive, preferably a pH indicator agent, said percentages being expressed by weight relative to the total weight of the composition.

Use

The invention also relates to a pollution removal method using the composition according to the invention.

The method according to the invention comprises the following steps:
1) adding the composition described above on the liquid;
2) waiting until the liquid pollutant is absorbed by the composition;
3) if necessary, check the pH of the residue obtained in Step 2);
4) repeating Steps 1) to 3) until complete absorption of the liquid and the formation of a solid residue; and
5) picking up the residue.

Step 1) may be performed in different ways depending on the pollution level. For example, if a laboratory scale pollution occurs (of the order of a few hundred mL), Step 1) may be carried out by adding a few tens of grams of the composition, around or on the polluting liquid, whereas when the pollution is of a larger scale (such as the overturning of a truck carrying a raw material), Step 1) may be carried out by a dumping, for example using a dump truck or a firefighter spear, around or on the polluting liquid.

If the composition of the invention comprises a pH indicator, the pH verification of Step 3) may be performed visually. The measures necessary for the handling of the residue (gloves, goggles) and storage or final treatment (ventilated shed, burial, etc.) can therefore be taken.

Once a solid residue is obtained, the residue is picked up with means commonly used by those skilled in the art, for example with a shovel or a vacuum cleaner.

Technical Effect

The composition for pollution removal according to the invention allows absorbing liquids with a minimum amount of product and at a lower cost compared to the products of the prior art.

The absorption capacity of a compound (or of the pollution removal composition) is expressed as L/kg and corresponds to the amount by weight of compound (pollution removal composition) that it is necessary to add to 1 L of water so that the resulting mixture is completely transformed into a solid form.

It can therefore be measured as follows:
1) 1 L of water is put into a container, preferably made of glass;
2) A predetermined amount of the composition of the present invention is added in said container;
3) Once the mixture is homogenized, the state (liquid or solid) of the mixture is checked. Steps 1) and 2) are repeated until obtaining a solid residue;
4) The amount in kg of the pollution removal composition added corresponds to the absorption capacity in kg/L of said composition.

According to a particular embodiment of the present invention, the composition according to the invention has an absorption capacity from 5 L to 90 L per 1 kg, preferably from 10 L to 70 L per 1 kg, even more preferably from 15 L to 50 L of said composition.

The composition of the present invention is not hazardous (non-toxic, non-irritating, non-allergenic and not ecotoxic), unlike the currently marketed products. It does not contain nanoparticles, which pose potential health risks.

When in use, the composition of the present invention does not cause a detrimental temperature increase to the surrounding environment, or, even if a temperature increase does occur, it is much lower than that of the currently marketed products.

Furthermore, the pick up of residue formed is easy and due to the minimum quantity of product used, storage and/or further treatment can be done at a very reasonable cost.

The invention will now be illustrated by the following nonlimiting examples.

EXAMPLES

In the examples below, the following commercial products are used:

Tixosil 68®: silica gel marketed by Rhodia having a particle size of 200 μm and a mass density of 300 kg/cm³.

Lignocel C250®: wood derived absorbent, marketed by JRS Pharma.

Sepiolite: Mediterranean natural clay absorbent.

Unisafe®: Synthetic absorbent marketed by Okotec based on silica and super absorbent polymer.

Example 1

1-1. Formulation

A pollution removal composition XY027-01 was prepared by mixing Tixosil 68® and Lignocel C250® in a weight ratio of 80/20.
Then, to this mixture were added:

| | |
|---|---|
| Tropaeolin | 0.01% |
| Thymol blue | 0.02% | the % are % by weight relative to the weight of the mixture Tixosil 68®/Lignocel C250®.

1-2. Liquid Absorption Test

The absorption test was performed successively with the following polluting liquids: 98% $H_2SO_4$, 100% $HNO_3$, 65% $HNO_3$, 50% soda, 30% ammonia, water, 0.9% NaCl, 40% $H_2O_2$, 13% bleach, oil, HCl 5N, NaOH 5N, EtOAc, toluene, formaldehyde, formic acid, and EtOH, using, on the one hand, the composition prepared above and, on the other hand, for comparison purposes with the sepiolite and Unisafe® according to the following protocol:
1) 1 L liquid to be cleaned up is put in a glass container;
2) 100 g of the composition is added into said container. Once the mixture is homogenized, the state (liquid or solid) of the mixture is checked.
3) Steps 1) and 2) are repeated until a solid residue is obtained.
4) Once a solid residue is obtained, said residue is picked up with a shovel.

The results of the absorption test are shown in FIG. 1.

It should be noted that whatever the pollutants and their concentrations, the composition of the present invention showed better absorption efficiency than the currently marketed products.

Furthermore, the cost of treatment using the composition according to the invention compared to the cost of treatment using the currently marketed compositions is considerably reduced. On average, it is reduced by more than 50% compared to the cost incurred by using of the Unisafe product, and by more than 75% compared to the cost incurred by using sepiolite.

In conclusion, the composition can absorb different polluting liquids at different concentrations using a minimum amount of product and at a lower cost than currently marketed products. In addition, the composition is not hazardous (non-toxic, non-irritating, non-allergenic and non ecotoxic), unlike some currently marketed products.

The invention claimed is:

1. A pollution removal composition consisting of:
   (a) at least one silica gel, and
   (b) at least one wood derived absorbing agent, and
   (c) optionally at least one additive selected from the group consisting of pH indicator agents, scents, dyes, flow improvers, bulking agents and mixtures thereof,
   said silica gel having a particle size from 60 to 500 μm and a mass density from 150 to 380 kg/m³; and
   the mass ratio between the silica gel and the wood derived absorbing agent being from 95:5 to 60:40;
   thereby said composition has an absorption capacity from 5 L to 90 L per 1 kg of said composition and allows removal of a pollution removal residue without leaving a residue bonded to a surface on which a liquid pollutant has spread.

2. The composition according to claim 1, wherein said silica gel has an absorption capacity from 1 L to 10 L per 1 Kg of said silica gel.

3. The composition according to claim 1, wherein said wood derived absorbing agent is selected from wood sawdust, wood chips, wood powder, chopped straw, ground corn, cellulose, hemicellulose, lignin, and mixtures thereof.

4. The composition according to claim 1, wherein the pH indicator agent is selected from tropaeolin, thymol blue, bromocresol purple, bromophenol blue, Congo red, neutral red, phenolphthalein, thymolphthalein, alizarin yellow R, and mixtures thereof.

5. The composition according to claim 1, wherein said silica gel is present in an amount ranging from 60% to 95% by total weight of the composition.

6. The composition according to claim 1, wherein said pH indicator agent is present in an amount ranging from 0.001% to 0.1%.

7. The composition according to claim 1, consisting of:
   from 60 to 95% by weight of the weight of the silica gel composition;
   from 5 to 40% by weight of the weight of the wood derived absorbent composition;
   from 0 to 2% by weight of the weight of at least one additive of the composition.

8. The composition according to claim 7, wherein the additive is a pH indicator agent.

9. The composition according to claim 1, wherein said silica gel has an absorption capacity from 1 L to 10 L per 1 Kg of said silica gel.

10. A method of pollution removal comprising the following steps:
   1) adding the composition according to claim 1 on a liquid pollutant spread over a surface;
   2) waiting until the liquid pollutant is absorbed by the composition;
   3) optionally, checking the pH of the residue obtained in Step 2);
   4) repeating Steps 1) to 3) until complete absorption of the liquid pollutant and the formation of a solid residue; and
   5) picking up the residue.

* * * * *